W. E. GRAY.
SPEED VARYING MECHANISM.
APPLICATION FILED JULY 14, 1921.

1,434,814.

Patented Nov. 7, 1922.
2 SHEETS—SHEET 1.

Witnesses:

Inventor
William E. Gray
By Joshua R. H. Potts
His Attorney

W. E. GRAY.
SPEED VARYING MECHANISM.
APPLICATION FILED JULY 14, 1921.

1,434,814.

Patented Nov. 7, 1922.
2 SHEETS—SHEET 2.

Witnesses:
W. Schnellhardt
B. G. Richards

Inventor
William E. Gray
By Joshua R H Potts
His Attorney

Patented Nov. 7, 1922.                                            1,434,814

UNITED STATES PATENT OFFICE.

WILLIAM E. GRAY, OF CHICAGO, ILLINOIS, ASSIGNOR TO MOORE ELECTRIC CORPORATION, OF CHICAGO, ILLINOIS.

SPEED-VARYING MECHANISM.

Application filed July 14, 1921. Serial No. 484,794.

*To all whom it may concern:*

Be it known that I, WILLIAM E. GRAY, a citizen of the United States, and a resident of the city of Chicago, county of Cook and State of Illinois, have invented certain new and useful Improvements in Speed-Varying Mechanisms, of which the following is a specification.

My invention relates to improvements in speed varying mechanisms especially adapted for use in driving hair clipper and similar mechanisms, the object of the invention being to provide a simple and efficient mechanism of this character.

Other objects will appear hereinafter.

The invention consists in the combinations and arrangements of parts hereinafter described and claimed.

Figure 1:
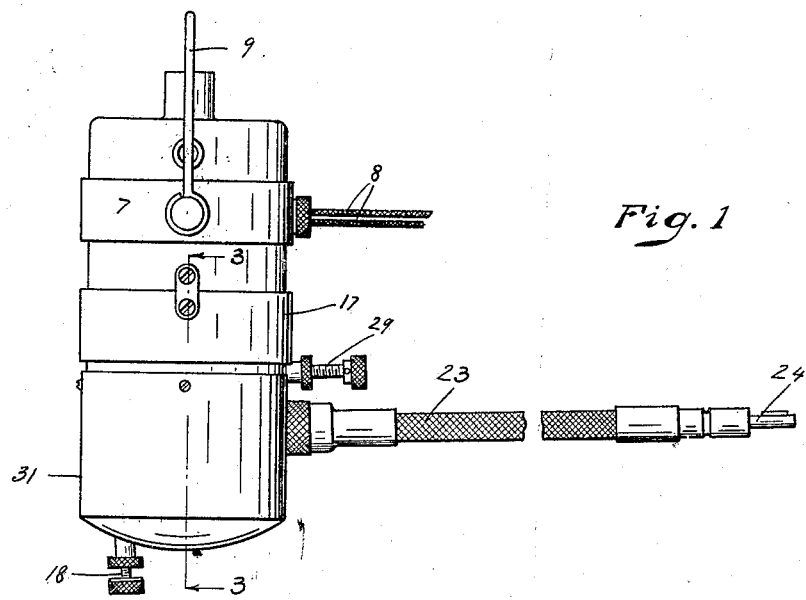
Figure 2:
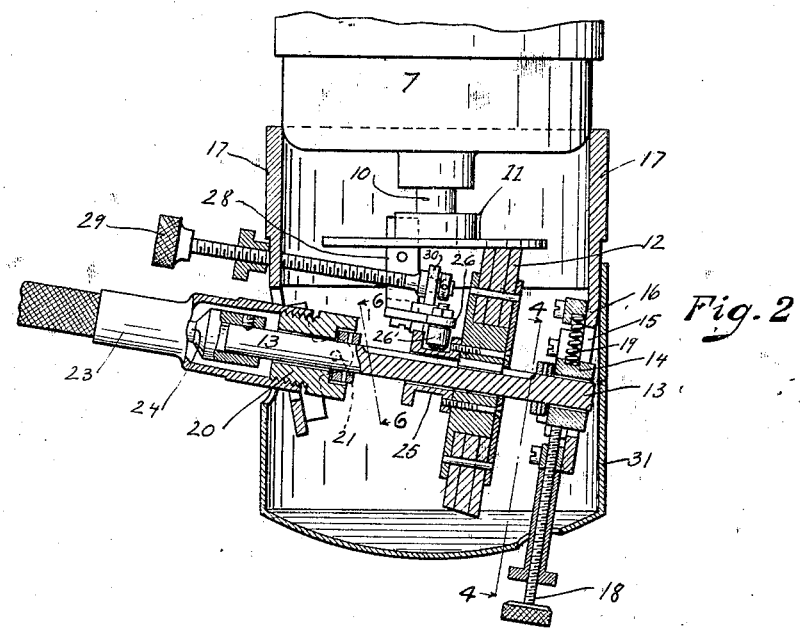
Figure 3:
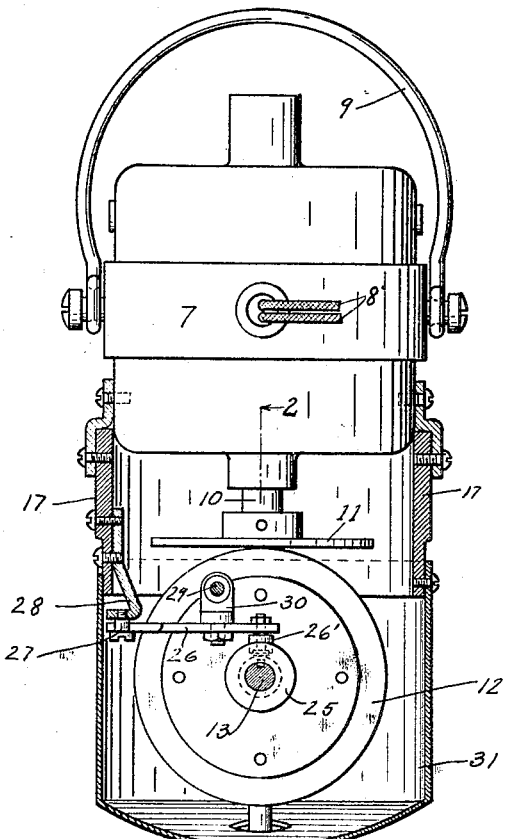
Figure 4:
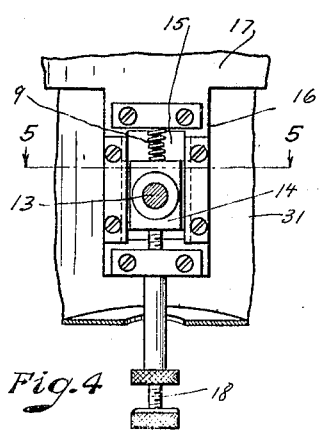
Figure 5:
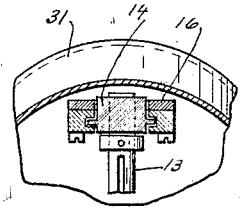
Figure 6:
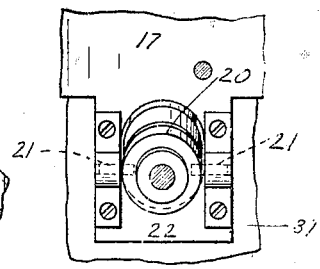

The invention will be best understood by reference to the accompanying drawings forming a part of this specification, and in which, Fig. 1 is a side view of mechanism embodying the invention, Fig. 2 is a section of the same taken substantially on line 2—2 of Fig. 3, Fig. 3 is an enlarged section taken substantially on line 3—3 of Fig. 1, Fig. 4 is a section taken on line 4—4 of Fig. 2, Fig. 5 is a section taken on line 5—5 of Fig. 4, and Fig. 6 is a section taken on line 6—6 of Fig. 2.

The preferred form of construction as illustrated in the drawings, comprises an electric motor 7 of any usual or desired construction fed with current by flexible wires 8 and provided with a suitable supporting bail 9 as shown. The motor shaft 10 carries a friction disk 11 contacting with a bevelled friction wheel 12, said friction wheel being preferably made of a plurality of plates of rawhide clamped and secured together as shown. The friction wheel 12 is splined or feathered on a countershaft 13 arranged across the face of the friction disk 11 at an angle thereto and in position to permit of contact between the friction wheel and the friction disk 11. One end of the shaft 13 is mounted in a bearing 14 slidable in a slot 15 in a bracket or lug 16 formed on a casing 17 secured to the motor casing 7 as shown. An adjusting screw 18 contacts with the outer side of the bearing block 14 and a compression spring 19 is arranged to contact with the inner side of said block whereby the corresponding end of the shaft 13 may be adjusted toward and away from the friction disk 11 to adjust the friction wheel 12 into nice contact with said disk. At its other end the shaft 13 is mounted in a bearing block 20 which is mounted to swing on pivot pins or trunnions 21 on an axis substantially parallel with the face of disk 11 and whereby adjustments of shaft 13 are permitted. A flexible shaft casing 23 is attached to the bearing block 20 and the flexible shaft 24, enclosed in said casing, is attached to the corresponding end of shaft 13 and whereby said flexible shaft 24 will be driven by shaft 13. The friction wheel 12 is provided with a grooved hub 25 engaging a roller 26' on a lever 26 fulcrumed at 27 on a bracket 28 secured to the casing 17 and whereby the friction wheel 12 may be shifted along the shaft 13. An adjusting screw 29 is threaded in the casing 17 and provided with a swivel connection with a post 30 on lever 26 for adjusting said friction wheel. A suitable casing or cap 31 is arranged over the working parts as shown and attached to the casing 17, suitable openings being provided in said casing 31 for the shaft casing 23 and the adjusting screw 18 as shown.

By this arrangement, the friction wheel 12 may be readily adjusted to various positions in contact with the face of friction disk 11 and the force of the contact between them nicely adjusted by means of the screw 18 so as to obtain varying speeds of rotation of shaft 24. When the disk 11 is rotating, the outermost points thereof travel at greater speeds than relatively inner points, and this is also true of the points on the contacting face of the bevelled friction wheel 12. Thus the bevelled contacting face of the friction wheel 12 tends to compensate for the different speeds of travel of the different points on the friction disk 12, tending to prevent slippage between said wheel and disk and prevent or lessen wear between them. The specific form and arrangement of parts is a simple and effective one for the purpose.

The flexible shaft 24 driven by the mechanism is especially adapted and arranged for operating hair clippers although capable of use for other purposes. By this arrangement, the motor 7 may be run at high speed which may be reduced and varied as desired.

Thus the shaft 24 may be operated at a comparatively slow speed and direct connection made with the clipper driving mechanism, thus tending to eliminate vibration in the clipper and greatly simplifying the parts thereof.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention, what I claim as new and desire to secure by Letters Patent is:

1. Speed varying mechanism comprising a friction disk; a shaft arranged across the face of said disk having one end pivoted at one side of the center of said disc, and forming with the face of said disc a variable angle; and a beveled friction wheel, adjustably mounted on said shaft contacting with said disk, substantially as described.

2. Speed varying mechanism comprising a friction disk; a shaft arranged across the face of said disk having one end pivoted at one side of the center of said disc, and forming with the face of said disc a variable angle; a bevelled friction wheel splined on said shaft contacting with said disk; and means for adjusting said wheel on said shaft, substantially as described.

3. Speed varying mechanism comprising a friction disk; a shaft arranged across the face of said disk having one end pivoted at one side of the center of said disc, and forming with the face of said disc a variable angle; a bevelled friction wheel adjustably mounted on said shaft contacting with said disk; and means for adjusting the angularity of said shaft, substantially as described.

4. Speed varying mechanism comprising a friction disk; a shaft arranged across the face of said disk having one end pivoted at one side of the center of said disc, and forming with the face of said disc a variable angle; a bevelled friction wheel splined on said shaft contacting with said disk; means for adjusting said wheel on said shaft, and means for adjusting the angularity of said shaft, substantially as described.

5. Speed varying mechanism comprising a friction disk; a shaft arranged across the face of said disk having one end pivoted at one side of the center of said disc, and forming with the face of said disc a variable angle; a bearing for one end of said shaft mounted to swing on an axis substantially parallel to the face of said disk; a bearing for the other end of said shaft mounted to slide toward and away from said disk; means for adjusting said slidable bearing; and a bevelled friction wheel splined on said shaft and contacting with said disk, substantially as described.

6. Speed verying mechanism comprising a friction disk; a shaft arranged across the face of said disk at an angle thereto; a bearing for one end of said shaft mounted to swing on an axis substantially parallel to the face of said disk; a bearing for the other end of said shaft mounted to slide toward and away from said disk; means for adjusting said slidable bearing; a bevelled friction wheel splined on said shaft and contatcing with said disk; a grooved hub for said friction wheel; a lever carrying a roller running in the groove of said hub and arranged to adjust said friction wheel along said shaft; and an adjusting screw connected with said lever substantially as described.

7. Speed varying mechanism comprising a friction disk; a shaft arranged across the face of said disk having one end pivoted at one side of the center of said disc, and forming with the face of said disc a variable angle; a bearing for one end of said shaft mounted to swing on an axis substantially parallel to the face of said disk; a bearing for the other end of said shaft mounted to slide toward and away from said disk; means for adjusting said slidable bearing; a bevelled friction wheel splined on said shaft and contacting with said disk; and a flexible shaft connected with said first-mentioned shaft adjacent said swinging bearing, substantially as described.

8. Speed varying mechanism comprising a friction disc; a shaft arranged across the face of said disc at an angle thereto; a bevelled friction wheel splined on said shaft and contacting with said disc; a pivotal bearing for one end of said shaft; guide members mounted adjacent the other end of said shaft; a bearing for the other end of said shaft slidably mounted in said guide members; and positive means for adjusting the pressure of said friction wheel against said disc, substantially as described.

In testimony whereof I have signed my name to this specification in the presence of two subscribing witnesses.

WILLIAM E. GRAY.

Witnesses:
JOSHUA R. H. POTTS,
FREDA C. APPLETON.